Patented Aug. 8, 1950

2,518,227

UNITED STATES PATENT OFFICE 2,518,227

DICARBOXYLIC ACID DERIVATIVES OF 2-SULFANILAMIDO-1,3,4-THIADIAZOLE

Herman Eldridge Faith, New Palestine, Ind., assignor to Allied Laboratories, Inc., Kansas City, Mo., a corporation of Delaware No Drawing. Application March 20, 1948, Serial No. 16,136

3 Claims. (Cl. 260—239.95)

The present invention relates to $N^4$-dicarboxylic acid derivatives of 2-sulfanilamido-1,3,4-thiadiazole and methods for their preparation. My invention is particularly concerned with the succinyl and phthalyl derivative of 2-sulfanilamido-1,3,4-thiadiazole.

In carrying out the process of the present invention, the compound 2-sulfanilamido-1,3,4-thiadiazole is reacted with succinic acid anhydride or phthalic acid anhydride to produce the corresponding $N^4$ dicarboxylic acid derivative of 2-sulfanilamido-1,3,4-thiadiazole.

My new compounds possess properties which may render them useful in the treatment of infectious diseases of the intestinal tract. They are, likewise, useful as intermediate for the production of other pharmaceuticals and dyestuffs.

The invention will be described in greater detail in conjunction with the following specific examples which, however, are merely illustrative of the preferred method and are not intended to limit the scope of the invention. The parts are by weight except in the case of liquids which are expressed in corresponding parts by volume.

Example I.—Preparation of 2-($N^4$-succinylsulfanilamido)-1,3,4-thiadiazole 20 parts of 2-sulfanilamido-1,3,4-thiadiazole are refluxed in 450 parts of absolute ethanol or in 280 parts of dry acetone with 23.5 parts of succinic anhydride for 1 hour. The reaction mixture is cooled and filtered. The product is washed with acetone. Then it is dissolved in cold dilute sodium hydroxide solution at pH 5.5 to 5.6. The solution is stirred with activated charcoal, filtered and acidified with hydrochloric acid to pH 3. 2-($N^4$-succinylsulfanilamido)-1,3,4-thiadiazole precipitates.

Example II.—Preparation of 2-($N^4$-phthalylsulfanilamido)-1,3,4-thiadiazole To seven parts of dry acetone are added 1.25 parts of 2-sulfanilamido-1,3,4-thiadiazole and 0.83 part of phthalic acid anhydride. The reactants are refluxed. Within five minutes a solution forms, followed by the precipitation of 2-($N^4$-phthalylsulfanilamido)-1,3,4-thiadiazole. The mixture is maintained at 60° C. for fifteen minutes after the crystals form and is then diluted with a little acetone and filtered. The product is washed with acetone and then with water. tI is purified by crystallizing from dilute ethanol.

What I claim is:

1. A compound selected from the group consisting of 2-($N^4$-succinylsulfanilamido)-1,3,4-thiadiazole and 2-($N^4$-phthalylsulfanilamido)-1,3,4-thiadiazole.
2. The compound 2-($N^4$-succinylsulfanilamido)-1,3,4-thiadiazole.
3. The compound 2-($N^4$-phthalylsulfanilamido)-1,3,4-thiadiazole.

HERMAN ELDRIDGE FAITH.

REFERENCES CITED

The following references are of record in the file of this patent:

UNITED STATES PATENTS

| Number    | Name     | Date          |
|-----------|----------|---------------|
| 2,391,853 | Zienty   | Dec. 25, 1945 |
| 2,404,200 | Weijlard | July 16, 1946 |

OTHER REFERENCES

Northey, Chem. Rev., vol. 27, p. 110 (1940).

Poth et al., Proc. Soc. Exp. Biol. Med., Dec. 1944, pp. 322–327.

Wiselogle: "Survey of Antimalarial Drugs 1941–1945" (J. W. Edwards: Ann Arbor, Mich., 1946); vol. II, part 2, page 1448.